(12) United States Patent
Jannyavula Venkata

(10) Patent No.: US 9,390,020 B2
(45) Date of Patent: Jul. 12, 2016

(54) HYBRID MEMORY WITH ASSOCIATIVE CACHE

(75) Inventor: Sumanth Jannyavula Venkata, Shakopee, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 549 days.

(21) Appl. No.: 13/543,079

(22) Filed: Jul. 6, 2012

(65) Prior Publication Data

US 2014/0013025 A1 Jan. 9, 2014

(51) Int. Cl.
G06F 12/00 (2006.01)
G06F 12/08 (2016.01)
G06F 12/02 (2006.01)
G06F 3/06 (2006.01)

(52) U.S. Cl.
CPC ............ *G06F 12/0873* (2013.01); *G06F 3/061* (2013.01); *G06F 3/068* (2013.01); *G06F 3/0638* (2013.01); *G06F 3/0641* (2013.01); *G06F 12/0246* (2013.01); *G06F 2212/205* (2013.01)

(58) Field of Classification Search
CPC    G06F 12/023–12/0246; G06F 3/0638–3/0641
USPC ......................................................... 711/103
See application file for complete search history.

(56) References Cited

U.S. PATENT DOCUMENTS

| 5,274,768 | A | 12/1993 | Traw et al. |
| 5,420,998 | A * | 5/1995 | Horning ..................... 711/113 |
| 5,644,789 | A | 7/1997 | Matthews et al. |
| 6,549,992 | B1 | 4/2003 | Armangau et al. |
| 6,948,015 | B2 | 9/2005 | Ogasawara et al. |
| 7,305,526 | B2 | 12/2007 | Benhase et al. |
| 8,180,964 | B1 | 5/2012 | Koh et al. |
| 8,195,881 | B2 | 6/2012 | Bohn et al. |
| 8,341,339 | B1 | 12/2012 | Boyle et al. |
| 8,489,820 | B1 | 7/2013 | Ellard |
| 8,583,879 | B2 * | 11/2013 | Na et al. ...................... 711/154 |
| 2002/0002655 | A1 | 1/2002 | Hoskins |
| 2002/0176430 | A1 | 11/2002 | Sangha et al. |
| 2003/0105937 | A1 | 6/2003 | Cooksey et al. |
| 2003/0105938 | A1 | 6/2003 | Cooksey et al. |
| 2003/0105940 | A1 | 6/2003 | Cooksey et al. |
| 2003/0196042 | A1 | 10/2003 | Hopeman et al. |

(Continued)

FOREIGN PATENT DOCUMENTS

EP          1890236          2/2008

OTHER PUBLICATIONS

Hallnor et al., "A Fully Associative Software-Managed Cache Design", ISCA '00 Proceedings of the $27^{th}$ Annual International Symposium on Computer Architecture, 2000, pp. 107-116.

(Continued)

*Primary Examiner* — Prasith Thammavong
(74) *Attorney, Agent, or Firm* — Hollingsworth Davis, LLC

(57) ABSTRACT

A hybrid memory system includes a primary memory comprising a host memory space arranged as memory sectors corresponding to host logical block addresses (host LBAs). A secondary memory is implemented as a cache for the primary host memory. A hybrid controller is configured map the clusters of host LBAs to clusters of solid state drive (SSD) LBAs. The SSD LBAs correspond to a memory space of the cache. Mapping of the host LBA clusters to the SSD LBA clusters is fully associative such that any host LBA cluster can be mapped to any SSD LBA cluster.

19 Claims, 7 Drawing Sheets

(56) References Cited

U.S. PATENT DOCUMENTS

| | | |
|---|---|---|
| 2003/0200393 A1 | 10/2003 | Cornaby et al. |
| 2004/0123043 A1 | 6/2004 | Rotithor et al. |
| 2005/0108491 A1 | 5/2005 | Wong et al. |
| 2005/0172074 A1* | 8/2005 | Sinclair .................. 711/114 |
| 2007/0022241 A1 | 1/2007 | Sinclair |
| 2007/0136523 A1 | 6/2007 | Bonella et al. |
| 2007/0250665 A1 | 10/2007 | Shimada |
| 2007/0288692 A1 | 12/2007 | Bruce et al. |
| 2009/0089501 A1 | 4/2009 | Ahn et al. |
| 2009/0106481 A1 | 4/2009 | Yang et al. |
| 2010/0023682 A1* | 1/2010 | Lee et al. .................. 711/103 |
| 2010/0095053 A1 | 4/2010 | Bruce et al. |
| 2010/0115172 A1 | 5/2010 | Gillingham et al. |
| 2010/0217952 A1 | 8/2010 | Iyer et al. |
| 2010/0325352 A1 | 12/2010 | Schuette et al. |
| 2011/0145489 A1 | 6/2011 | Yu et al. |
| 2012/0191936 A1 | 7/2012 | Ebsen et al. |
| 2012/0210041 A1 | 8/2012 | Flynn et al. |
| 2012/0266175 A1 | 10/2012 | Zheng |
| 2012/0311237 A1 | 12/2012 | Park |
| 2012/0317364 A1 | 12/2012 | Loh |
| 2013/0024625 A1 | 1/2013 | Benhase et al. |
| 2013/0191601 A1 | 7/2013 | Peterson et al. |
| 2013/0246688 A1 | 9/2013 | Kanno et al. |
| 2013/0268728 A1 | 10/2013 | Ramanujan et al. |
| 2013/0339617 A1 | 12/2013 | Averbouch et al. |
| 2014/0013026 A1 | 1/2014 | Venkata et al. |
| 2014/0013027 A1 | 1/2014 | Venkata et al. |
| 2014/0013047 A1 | 1/2014 | Sawin et al. |
| 2014/0013052 A1 | 1/2014 | Sawin et al. |
| 2014/0013053 A1 | 1/2014 | Sawin et al. |
| 2014/0207997 A1 | 7/2014 | Peterson et al. |
| 2014/0281134 A1* | 9/2014 | Eitan .................. G06F 12/0246 711/103 |

OTHER PUBLICATIONS

File History for U.S. Appl. No. 13/543,303.
File History for U.S. Appl. No. 13/543,100.
File History for U.S. Appl. No. 13/971,778.
Office Action dated Mar. 29, 2016 for U.S. Appl. No. 13/971,778, 22 pages.

* cited by examiner

HYBRID MEMORY WITH ASSOCIATIVE CACHE

SUMMARY

A hybrid memory system includes a nonvolatile primary memory comprising a host memory space arranged as memory sectors corresponding to host logical block addresses (host LBAs). A secondary memory is implemented as a cache for the primary host memory. A hybrid controller is configured to map the clusters of host LBAs to clusters of solid state drive (SSD) LBAs. The SSD LBAs correspond to a memory space of the cache. Mapping of the host LBA clusters to the SSD LBA clusters is fully associative such that any host LBA cluster can be mapped to any SSD LBA cluster.

A method of implementing a hybrid memory system includes mapping clusters of host logical block addresses (LBAs) corresponding to a host LBA space to solid state drive (SSD) LBA clusters. The host LBA space corresponds to a memory space of a nonvolatile primary memory and the SSD LBA clusters corresponding to memory space of a secondary memory. The secondary memory may be arranged to operate as a fully associative cache for the primary memory, wherein any host LBA cluster can be mapped to any SSD LBA cluster.

A hybrid memory system includes a hard magnetic disk drive (HDD) which comprises a memory space arranged as memory sectors corresponding to host logical block addresses (LBAs). A flash memory is configured to serve as a cache for the HDD. A hybrid controller is configured to map the clusters of host LBAs to clusters of solid state drive (SSD) LBAs, the SSD LBAs corresponding to a memory space of the flash memory. The mapping of the host LBA clusters to the SSD LBA clusters being fully associative wherein any host LBA cluster can be mapped to any SSD LBA cluster.

These and other features and aspects of the various embodiments disclosed herein can be understood in view of the following detailed discussion and the accompanying drawings.

DETAILED DESCRIPTION

Some memory devices use at least two types of memory in a hybrid or tiered memory system, where at least one type of memory is used as a primary memory and at least one other type of memory is used as a secondary memory that operates as a cache. The primary memory may have greater storage capacity but slower access times than the secondary memory, for example. In this arrangement, the secondary memory can serve as a read cache and/or a write cache for the primary memory. One example of such a tiered memory device is a hybrid drive, in which the primary memory may comprise nonvolatile memory such as magnetic disk, magnetic tape, and/or optical disk and the secondary memory may comprise solid state flash memory, and/or the secondary memory may be a nonvolatile or volatile memory with or without battery backup. Note that the terms "primary memory" and "secondary memory" are used herein to denote differences in memory (e.g., usage, capacity, performance, memory class or type, etc.) and not necessarily order or preference. Furthermore, although examples provided herein refer to the primary memory as magnetic disk and to secondary memory as flash memory, the disclosed approaches are applicable to any types of primary and secondary memory.

Figure 1A:
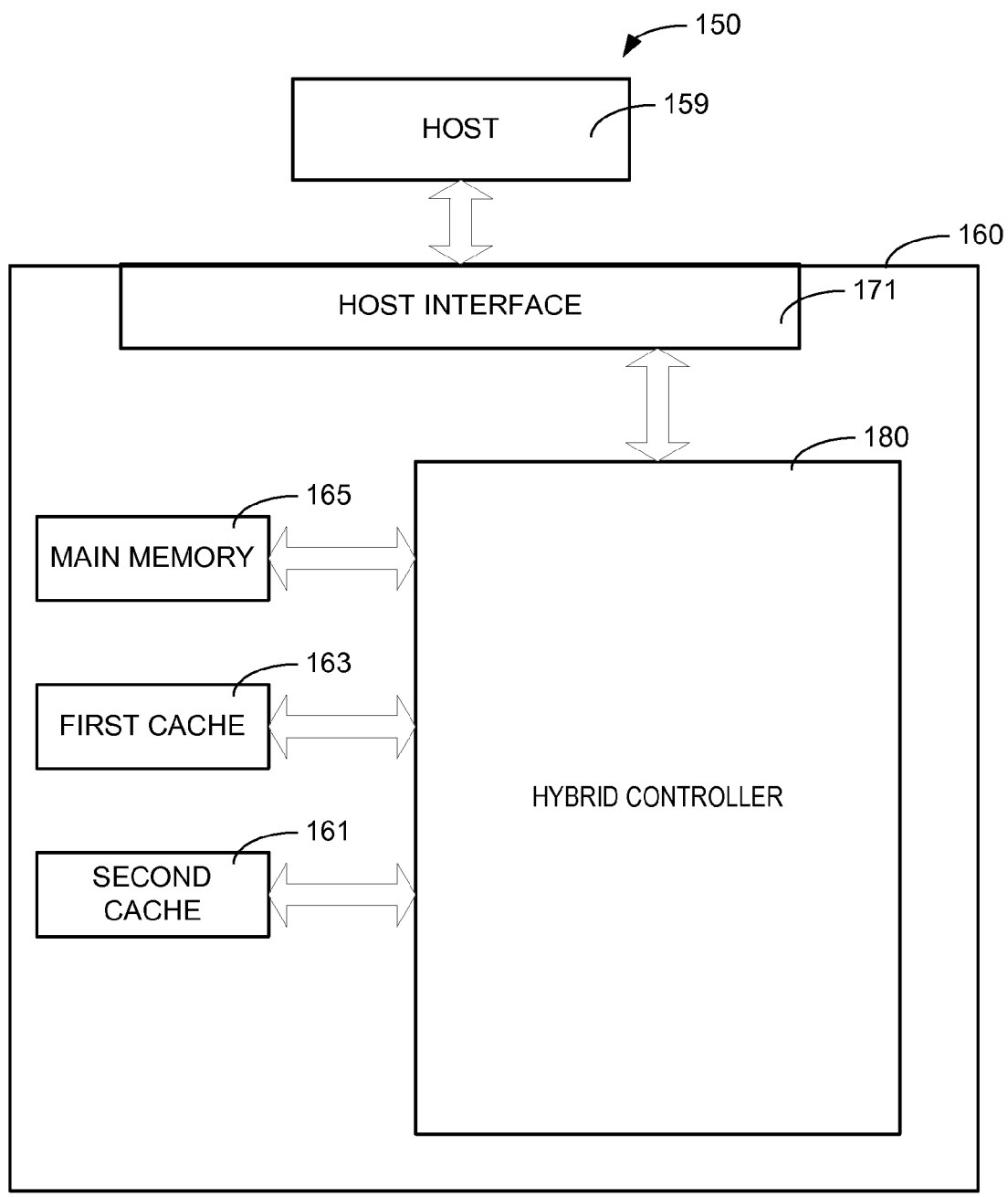
FIG. 1A is a block diagram of a hybrid memory system configured to manage memory access requests in accordance with some embodiments.

FIG. 1A is a diagram of a system 151 that includes a hybrid memory 160 comprising a number of memory components including a main memory 165, a first cache 163 and a second cache 161. The hybrid memory 160 is coupled to a host processor 159 through a host interface 171. The host interface 171 communicatively couples the host processor 159 to a hybrid controller 180. The first cache 163 and the second cache 161 can be configured to temporarily store data to enhance throughput to the main memory 165. The main memory 165 includes a memory space that corresponds to a number of memory sectors, each sector addressable using a unique a logical block address (LBA). The sectors of the main memory 165 are directly accessible by the host 159 using the LBAs, and thus the corresponding LBAs of the main memory are referred to herein as host LBAs.

The host 159 sends memory access requests to the hybrid drive 160 to read or write data. The memory access requests may specify a host LBA range used for the operation of the memory access request. For example, a memory access request from the host 159 may request that a host LBA range be written to the hybrid drive 160 and/or a memory access request may request that a host LBA range be read from the hybrid drive 160. The memory access requests are managed by the hybrid controller 180 to cause data to be written to and/or read from the hybrid drive with optimal efficiency. The second cache 161 in this example may optionally be read-only, in that only data marked for read operations by the host 159 are placed in the second cache 161. In such a configuration, data marked for writing are sent directly to the main storage 165, either directly or via the first cache 163.

According to some embodiments, the controller of the hybrid memory device (also denoted hybrid drive) may be implemented as a hierarchy of abstraction layers. Pairs of the abstraction layers are communicatively coupled through application programming interfaces (APIs). The organization of the hybrid controller 160 into abstraction layers to some extent allows each layer to work relatively independently and/or can reduce potential conflicts that arise from processing multiple threads of execution. For purposes of discussion, some examples provided below are based on the use of a magnetic disk as the main memory, dynamic random access memory as the first (or primary) cache, and solid state flash memory as the second (or secondary) cache. It will be apparent to those skilled in the art that the various memory components 161, 163, 165 are not restricted to these types of memory and may be implemented using a wide variety of memory types.

In some configurations, the cache 161 may be configured as a secondary cache, being faster and smaller than the main storage 165. The cache 163 is a primary cache, being faster and smaller than the secondary cache 161. Generally, the terms "primary" and "secondary" or "first" and "second" refer generally to hierarchy of time and/or priority relative to commands received via the host interface 171. For example, current read/write requests from the host 159 may be processed first via the primary cache 163 (e.g., identified by the data's logical block address). This enables host commands to complete quickly should the requested data be stored in the primary cache 163. If there is a miss in the primary cache 163, the requested data may be searched for in the secondary cache 161. If not found in either, requested data may be processed via the main storage 165.

Some of the data stored in the primary cache 163 may either be copied or moved to the secondary cache 161 as new requests come in. The copying/movement from primary cache 163 to secondary cache 161 may also occur in response to other events, e.g., a background scan. Both copying and moving involve placing a copy of data associated with an LBA range in the secondary cache, and moving may further involve freeing up some the LBA range in the primary cache for other uses, e.g., storing newly cached data.

Figure 1B:
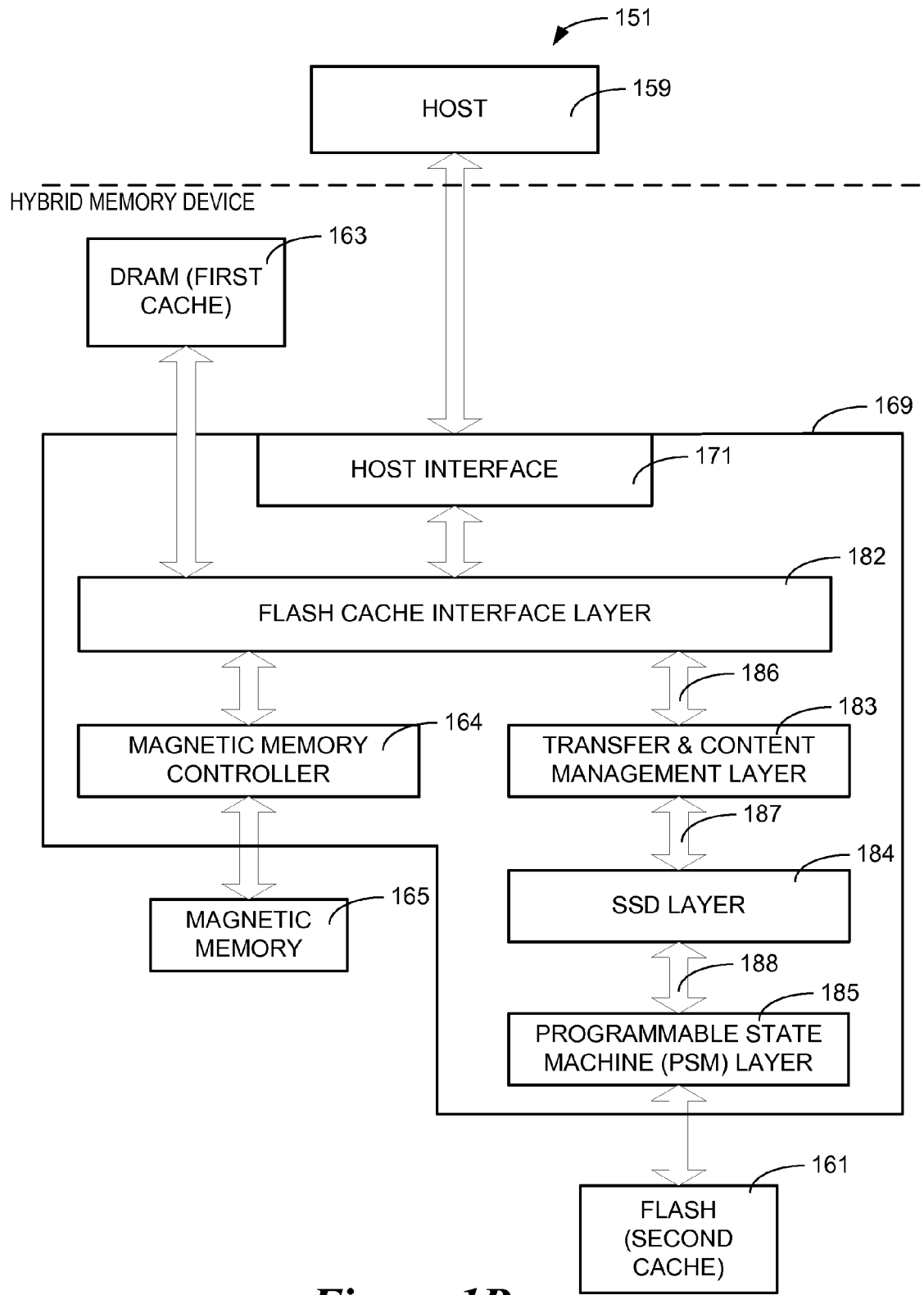
FIG. 1B is a block diagram of a hybrid memory system that includes a magnetic disk as a primary memory and a flash memory as a secondary memory, the hybrid memory system configured to manage memory access requests in accordance with some embodiments.

FIG. 1B illustrates a more detailed version of a system 151 that includes a host processor 159 coupled to a hybrid memory device. The hybrid memory device includes a magnetic memory 165 which serves as the main memory, dynamic random access memory (DRAM) 163 arranged as a first cache, and flash memory 161 arranged as a second cache. In this configuration, the flash cache 161 acts as a second cache, being faster but smaller than the main memory 165. The DRAM 163 serves as the first cache, being faster but smaller than the flash cache 161. While there is some processing and data transfer overhead in using the one or more caches 163, 161, the faster media used by the cache may enhance overall performance of the apparatus hybrid memory device.

The host processor 159 communicates with the hybrid memory device (also referred to herein as hybrid drive) through a host interface 171. As previously discussed, the main memory 165 includes a memory space that corresponds to a number of memory sectors, each sector addressable using a unique a logical block address (LBA). The sectors of the main memory 165 are directly accessible by the host 159 using the LBAs, and thus the corresponding LBAs of the main memory 165 are referred to herein as host LBAs.

The host 159 sends memory access requests to the hybrid drive, for example, the host 159 may request that data be written to and/or read from the hybrid memory device. The host interface 171 is configured to transfer memory access requests from the host 159 to the hybrid memory device and to transfer data between the host 159 and the hybrid memory device.

The hybrid controller 169 illustrated in FIG. 1B includes number of layers 182, 183, 184, 185 wherein each layer communicates to its nearest neighboring layer(s), e.g., through a set of requests. For example, each layer 182, 183, 184, 185 may only communicate to its nearest neighboring layer(s) without communicating to other layers. As an example, the layer 183 may only communicate directly to layer 184 and layer 182, without communicating directly with the layer 185 or to the host interface 171. As an operation, such as a memory access request from the host 159, is being carried out, each layer is configured to pass control to the next lower layer as the operation is implemented.

The example illustrated in FIG. 1B includes four layers 182-185 which are described in terms applicable to the use of flash memory as a cache. It will be appreciated that these terms are not restrictive, and if other types of memory were used as the secondary memory, if desired, different terminology could be used to reflect the type of secondary memory. Nevertheless, the basic functions of the layers can be similar, regardless of the type of memory used for primary and/or secondary memory, and/or the terminology used to describe the layers.

The layers illustrated in FIG. 1B include: the flash cache interface (FCI) layer 182; the flash cache control and transfer management (FCTM) layer 183; the solid state drive (SSD) layer 184; and the programmable state machine (PSM) layer 185. Requests may be passed as indicated by arrows 186, 187, 188 from a higher layer to the next lower layer starting with the FCI layer 182 and proceeding to the PSM layer 185 which interacts directly with the flash memory 161. The layered architecture of the hybrid controller 169 described herein allows for handling host memory access requests which can be serviced from either the magnetic memory 165 or one of the caches 163, 161 The layered structure used in conjunction with the flash cache 161 can be configured to achieve specified rates and response times for servicing memory access requests.

The FCI layer 182 decides whether a host read request should be serviced from the primary memory or from one of the caches 163, 161. The FCI layer 182 implements processes to determine which data should be promoted to the flash secondary cache 161 and/or the primary cache 163 based on various criteria to achieve optimal workload for the hybrid drive 160. The flash content and transfer management (FCTM) layer 183 maintains a mapping, e.g., a fully associative mapping as discussed below, of the host LBAs to a memory space corresponding to the flash memory space arranged as LBAs which are referred to as solid state drive (SSD) LBAs. The SSD layer 184 interacts with programmable state machine (PSM) layer 185 and performs tasks such as optimal scheduling of promotion requests among dies of the flash (referred to as die scheduling), wear leveling, garbage collection and so forth. The SSD layer 184 maps the SSD LBAs of the FCTM layer 183 to physical flash locations (die, block and page locations). The PSM layer programs hardware controllers to generate the required signals to read from and write to the flash 161, for example.

In some cases, one or more of the layers 182-185 of the hybrid controller 169 may be implemented by circuitry and/or by one or more processors, e.g., such as reduced instruction set computer (RISC) processors available from ARM. In some cases each layer may be implemented by a separate processor. The processes discussed herein are implementable in hardware (interconnected electronic components that carry out logic operations) and/or by a processor implementing software instructions, and/or by any combination of hardware and software.

Embodiments described herein involve processes carried out by the FCTM layer to implement a fully associative cache in the flash memory. In connection with implementation of the fully associative cache, the FCTM layer receives memory access requests from the FCI layer that include host LBA ranges. In some cases, the FCTM layer clusters (partitions) the host LBAs into clusters. The host LBAs (or host LBA clusters) are mapped to SSD LBAs or clusters of SSD LBAs. The FCTM issues requests to the SSD layer that include SSD LBAs or clusters of SSD LBAs. In the SSD layer, the clusters of SSD LBAs are mapped to physical flash addresses, i.e., die, block, and page addresses.

As introduced above, the FCI layer receives various memory access requests from the host, and, in response to the host requests, the FCI layer issues various memory access requests to the FCTM layer. For example, in some embodiments, the requests from the FCI layer to the FCTM layer may include promote requests (requests to store cluster-aligned host LBAs in the flash memory), read requests (requests to read host LBAs from flash memory), invalidate requests (requests to mark cluster-aligned host LBAs as invalid in flash memory), and lookup requests (requests to determine if host LBAs are present in flash memory). The FCTM layer is configured to support fully associative mapping of host LBA clusters to SSD LBA clusters for these requests. Each request from the FCI layer identifies the type of request, e.g., read, promotion, invalidate, etc., and also includes a host LBA range. The FCTM maps the LBA address range specified in the FCI memory access requests to clusters in the SSD LBA space.

Figure 2:
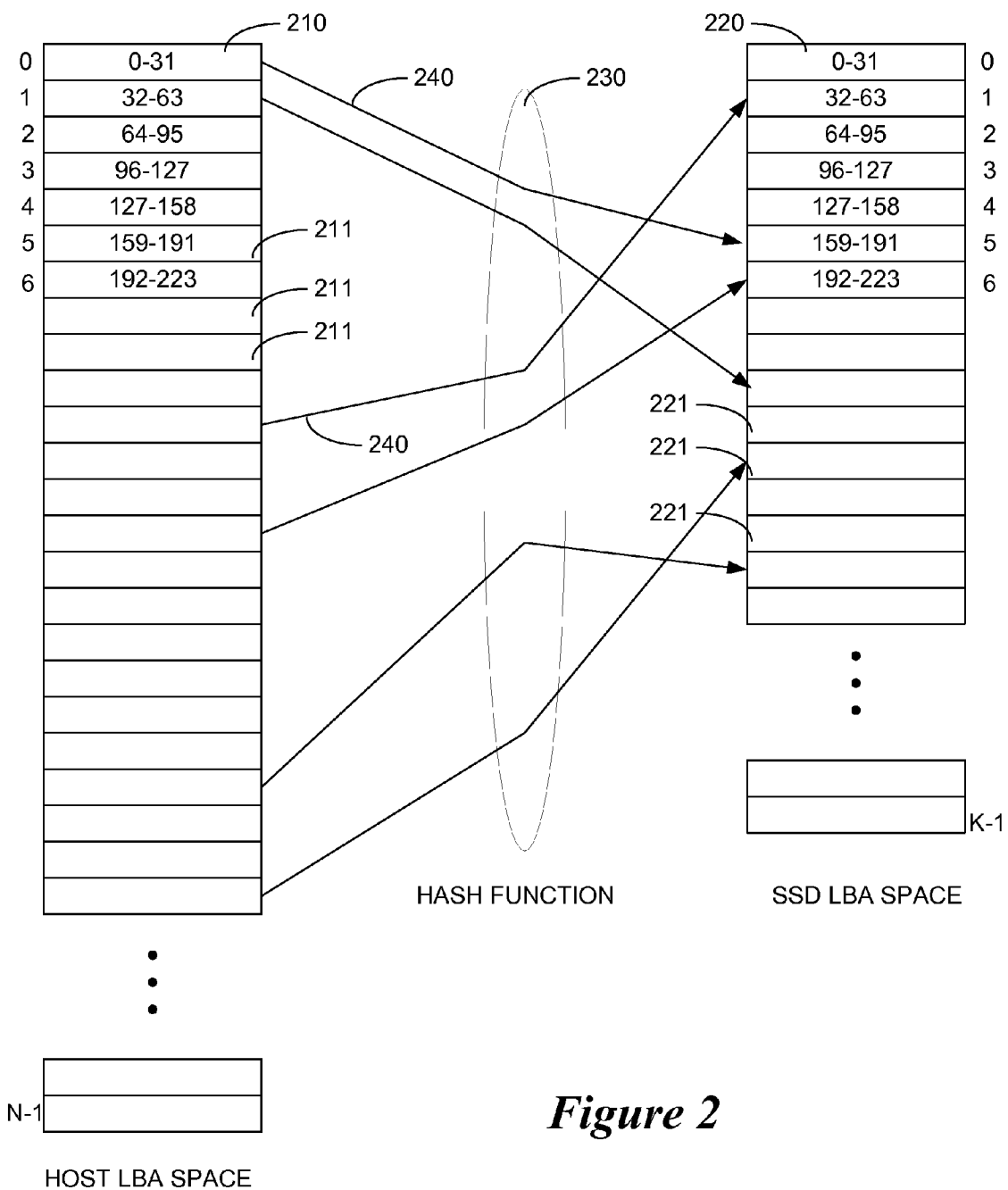
FIG. 2 illustrates a fully associative cache structure according to some embodiments.

The mapping of the host LBA clusters to the SSD clusters by the FCTM layer is fully associative meaning that any host LBA cluster can be mapped to any of the SSD LBA clusters, so long as there is room in the cache. FIG. 2 diagrammatically depicts mapping of the host LBA space 210 to the SSD LBA space 220. In the FCTM layer, the host LBA space is clustered into clusters of host LBAs and the SSD LBA space is clustered into clusters of SSD LBAs. In the host LBA space 210 each cluster 211 of host LBAs is uniquely identified by a number between 0 and N−1 and each cluster 211 includes n contiguous sectors. In the SSD LBA space 220, each SSD cluster 221 is uniquely identified by a number between 0 and K−1 (K is typically less than N) and each cluster 221 includes n sectors. The number of sectors per cluster, n, may be fixed and can depend on the size of a host sector, the geometry of the flash memory, the error correction code (ECC) used to store data in the flash memory, and/or other factors. In the example illustrated in FIG. 2, n=32, however, in other implementations, n may be greater than or less than 32. Furthermore, in general, n need not be a power of two.

In some implementations, and as shown in FIG. 2, the host sectors are aligned with the cluster boundaries. In other words, a host LBA is not allowed to span more than one host LBA cluster.

The mapping from host LBA space 210 to SSD LBA space 220 is accomplished by a hash function 230. As previously discussed, the hash function can support fully associative caching with regard to clusters. In other words, the hash function 230 allows any host cluster 211 to be mapped to any SSD cluster 221 as indicated by arrows 240. However, the mapping may be constrained such that any host LBA can exist in only one SSD cluster at any given time. The offset within a cluster where an LBA is located within a cluster is fixed and is can be determined by the host LBA modulo the number of host LBAs per cluster, i.e., the remainder resulting from dividing the host LBA by n. Allowing a host LBA cluster to be mapped into any SSD cluster and ensuring that promotes and invalidates implemented by the FCTM layer are aligned to cluster boundaries avoids cache fragmentation.

Figure 3:
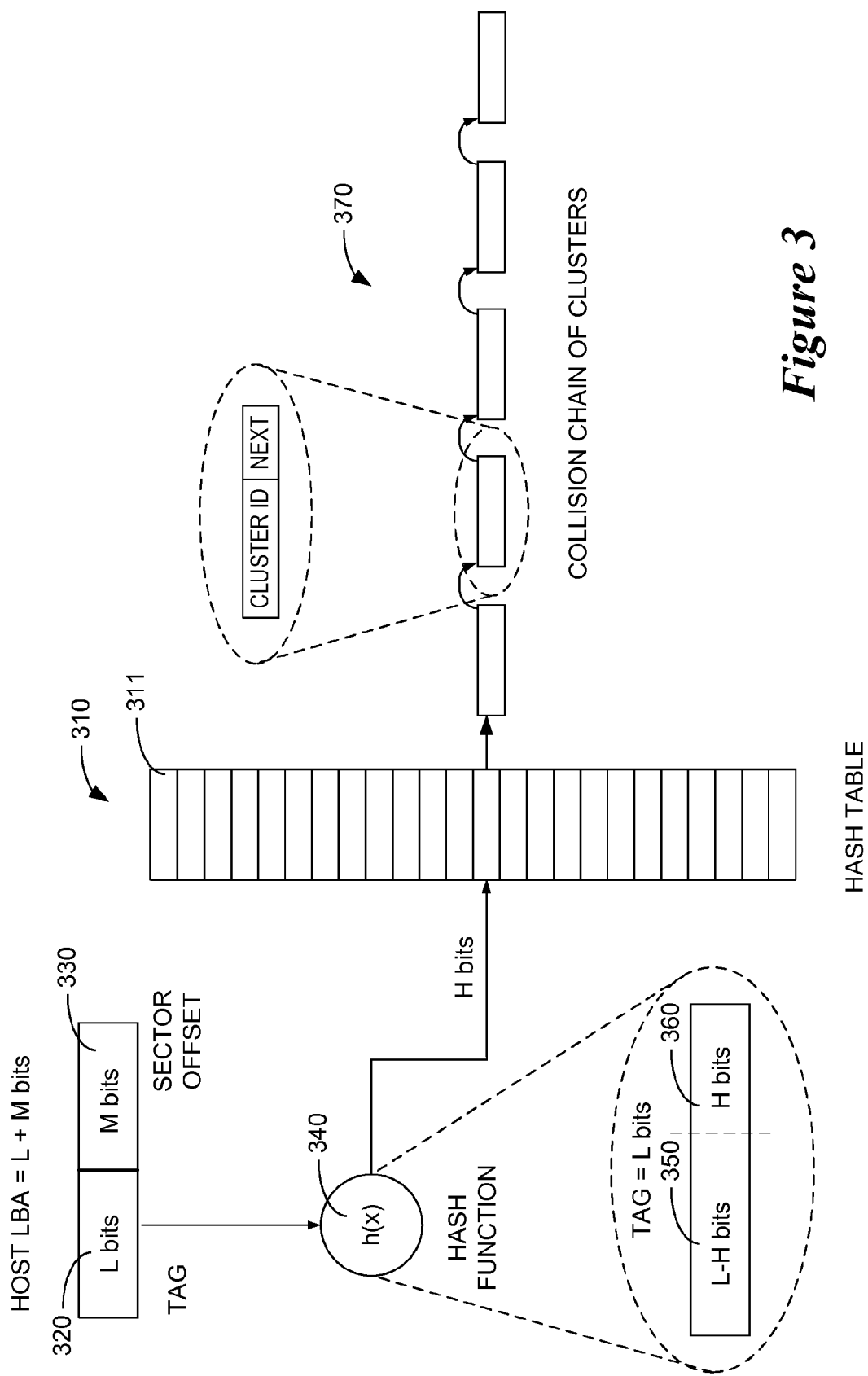
FIG. 3 illustrates a process of mapping host logical block addresses (LBAs) to cache LBAs in accordance with some embodiments.

FIG. 3 is a diagram that illustrates the implementation of the hash function which provides a process for keeping track of the host LBA clusters stored in the flash. In this example, the hash function 340 is relatively simple, although more complex hash functions could be used. For most implementations, the hash function that is fastest is generally optimal. A hash table 310 is used to keep track of the mapping of the host LBA space to the SSD space. A number, L, of the more significant bits 320 of the host LBA are used as a tag to identify the corresponding cluster in the SSD LBA space. The remaining M less significant bits 330 of the host LBA are used as a sector offset that identifies the sectors within the SSD cluster.

The hash function 340 is used to convert the tag (upper L bits of the host LBA) into a hash table index in the hash table 310. The entry in the hash table 310 indicated by the hash table index 311 (the tag converted by the hash function) points to one or more clusters in the SSD LBA space. For example, for a host LBA of L+M bits, the lower M bits can be used as a sector offset to identify the sector within an SSD cluster. The remaining L bits are used for the tag. The hash function 340 operates on the tag 320 to generate the index into the hash table 310. For example, the hash function may discard the upper L-H bits 350 of the tag and use the lower H bits as the hash table index. Discarding a portion of the tag means that in some cases a number of different host LBAs will map to the same entry in the hash table, and a collision will occur. An entry 311 in the hash table 310 is associated with more than one cluster identification (ID) only if a collision occurs. In this scenario, $2^M$ host LBAs mapped to a cluster will all have the same tag. If the hash function discards the upper bits leaving only H lower bits for the hash table index, the theoretical maximum number of possible collisions (i.e., the number of clusters that map into the same SSD LBA space) is $2^{(L-H)}$. The L-H bits of the tag identify the cluster ID. The collisions are resolved using a linked list 370. The linked list contains the cluster IDs that are hashed to the same entry in the hash table (i.e., have the same hash index). To access a particular cluster, the linked list is scanned for an entry with the correct cluster ID. For example, when the FCI layer requests a look up involving a particular host LBA cluster, the FCTM layer applies the hash function, and if there is a collision (two clusters that map to the same space) then the FCTM layer traverses through the linked list to locate the requested cluster.

The above description assumes that the number of host sectors per cluster is a power of two. However, non-power of two sector sizes may also be used. A representative set of host sector sizes that are supportable by the fully associative cache structure described herein include, but is not limited to, the following sector sizes: 512, 520, 524, 528, 4096, 4192, and 4224 bytes. For example, based on sector to cluster mapping calculations, there may be 30 5XX byte sectors per cluster (assuming a cluster is 16 KB of the flash, such as an 8 KB flash page size with dual plane support).

Non-powers of two can be handled by modifying the mapping described above as follows: The tag is determined as tag=host LBA/sectors per cluster, where/indicates an integer division via truncation and the host sector offset within the cluster is determined by host LBA modulo the sectors per cluster, i.e., the remainder after dividing the host LBA by the sectors per cluster.

The division and modulo operations can be implemented by executing a multiply instruction, e.g., a 64 bit multiply instruction on the FCTM processor, assuming the FCTM processor supports 64 bit multiple instructions. To facilitate the multiply, the value p=0xFFFFFFFF/sectors per cluster is pre-computed—is a constant value. The tag is now determined by tag=(host LBA*p)>>32, where * indicates a 64 bit multiply operation and where >>32 means that the result of (host LBA*p) is right shifted 32 times. Using this process, there is a possibility that the tag is off by one. To correct for this occurrence, the tag is incremented by one if the following condition is satisfied: (Host LBA−tag* sectors per cluster≥sector per cluster. The remainder can be similarly determined.

The FCTM maintains a cluster use list and a cluster free list in metadata of the FCTM. SSD clusters in the use list are those that are currently being used and correspond to valid data stored in the flash. SSD clusters in the free list are those clusters that are available to be written to. The flash can become saturated meaning that there are no SSD clusters in the free list (all SSD clusters are in the use list). If the cache is saturated, there is no space available in the flash to implement requests from the FCI layer to promote (write) data to the flash unless an eviction occurs. During execution of a promotion request, if the cache is saturated, the FCTM layer performs an eviction before allocating SSD clusters for the promotion. For example, the FCTM layer may perform an eviction by evicting SSD clusters identified as the least valuable to make room for the new clusters to be written. In other words, if the promotion request involves writing J clusters to the flash, then the FCTM module evicts the J least valuable clusters from the flash.

The FCTM layer maintains a most valuable least valuable (MVLV) list to identify the least valuable clusters. The MVLV list may comprise a linked list of all the SSD clusters in ranked order according to a value level determined by the FCTM module. The value level of a cluster may be based on how recently the SSD cluster was used and/or may be based on how frequently the SSD cluster was used. The MVLV list may be updated in conjunction with the execution of some memory access requests. For example, when a read request is executed by the FCTM, the SSD clusters involved in the request are moved to the head of the MVLV list making them the most valuable. Similarly, when a promotion request is executed by the FCTM, the SSD clusters involved in the promotion request are moved to the head of the list making them the most valuable.

Figure 4:
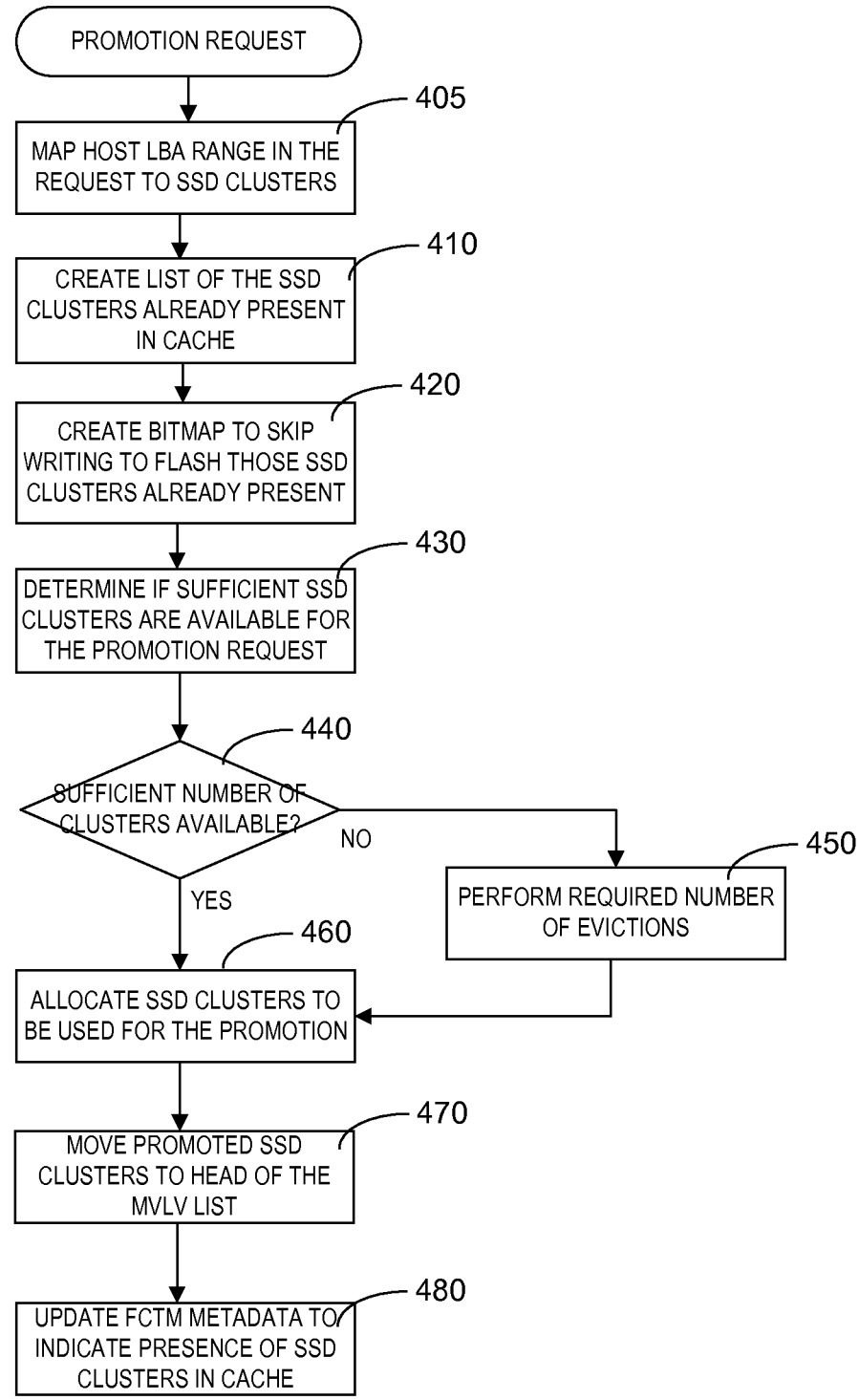
FIG. 4 is a flow diagram that conceptually illustrates a promotion request that may be implemented by the hybrid controller.

An approach for implementing a promotion request by the FCTM layer is conceptually illustrated in the flow diagram of FIG. 4. The promotion request from the FCI layer includes a cluster aligned host LBA range to be promoted to the cache. A cluster aligned host LBA range is an LBA range that starts at the beginning of a cluster and ends at the end of a cluster. In other words, the cluster aligned LBA range does not include partial clusters.

In response to the promotion request, the FCTM layer maps 405 the cluster aligned host LBA range of the request to SSD clusters. The FCTM determines if the cluster aligned host LBA range corresponds to any SSD clusters. If so, these SSD clusters are already present in the flash and are referred to herein as overlapped clusters. The FCTM layer creates 410 a list of the overlapped SSD clusters. Because these overlapped SSD clusters are already stored in the flash, re-writing the overlapped clusters to the flash is unnecessary. To avoid re-writing clusters, the FCTM layer creates 420 a bitmap of the overlapped SSD clusters and skips writing these clusters to the flash when executing the promotion request. Identifying overlapped clusters to avoid re-writing the overlapped clusters to the flash reduces memory wear. For example, if all cluster aligned host LBAs in the promotion request are already stored in the flash (the host LBA range of the promotion request is entirely present in overlapped clusters), no data transfer to the flash occurs (the FCTM does not issue a write request to the SSD layer). If some host LBAs of the promotion request are already present in the flash, then the FCTM uses the bitmap to exclude the overlapped SSD clusters already present in the cache from being re-written to the flash.

The FCTM layer determines 430 if there are sufficient SSD clusters available to implement the promotion request by checking the use list maintained in the FCTM metadata. If not 440, the FCTM evicts 450 the required number of SSD clusters. The clusters at the tail of the MVLV list are chosen for eviction. The FCTM allocates 460 SSD clusters to be used for the promotion and executes the promotion by writing to the flash. In this example, the promoted SSD clusters are now most valuable because they are the most recently used SSD clusters. The promoted SSD clusters are moved 470 to the head of the MVLV list. The FCTM maintains a cluster use list and a cluster free list in metadata of the FCTM. SSD clusters in the use list are those that are present in the flash. SSD clusters in the free list are those available to be written to. In conjunction with execution of a promotion request, the FCTM metadata is updated 480 to indicate that the promoted SSD clusters are in use.

Figure 5:
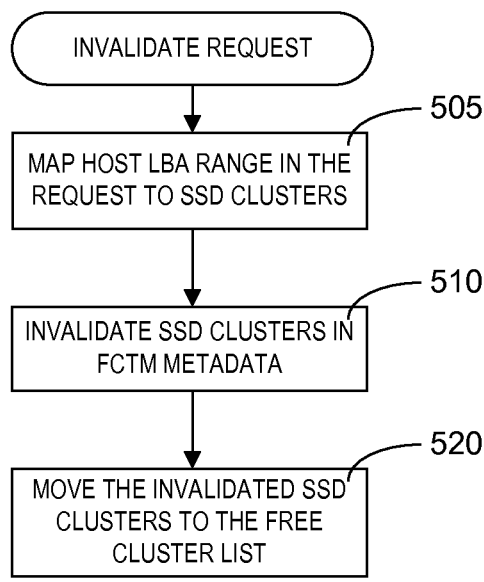
FIG. 5 is a flow diagram that conceptually illustrates an invalidate request that may be implemented by the hybrid controller.

FIG. 5 is a flow diagram that conceptually illustrates an invalidate request issued from the FCI layer to the FCTM layer and implemented by the FCTM layer. Note that implementation of an invalidate request does not require any work performed by the flash. An invalidate request issued by the FCI layer identifies a cluster aligned range of host LBAs to be invalidated. The FCTM maps 505 the cluster aligned host LBA range to the SSD clusters. The SSD clusters are invalidated 510 (marked as containing invalid data) in the FCTM metadata. The invalidated clusters may be moved 520 to the free cluster list maintained by the FCTM in metadata.

Figure 6:
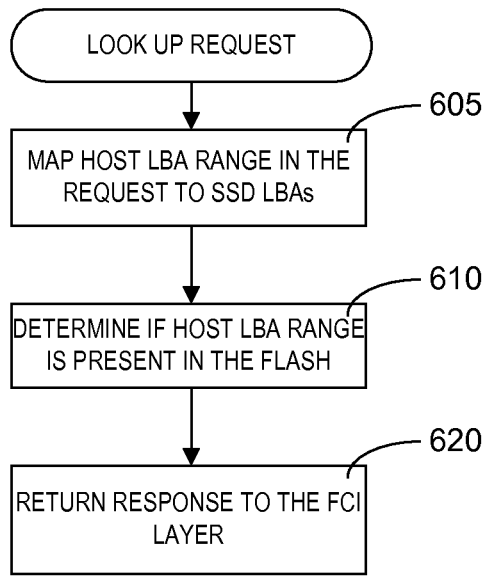
FIG. 6 is a flow diagram that conceptually illustrates a look up request that may be implemented by the hybrid controller.

FIG. 6 is a flow diagram that conceptually illustrates a look up request issued by the FCI layer to the FCTM layer and implemented by the FCTM layer. Note that implementation of a look up request does not require any work performed by the flash. A look up request is typically issued by the FCI layer in response to a host read command to determine whether the host LBA range is stored in the flash. The FCI layer can request a look up for any host LBA range, the requested host LBA range need not be cluster aligned. The FCTM layer maps 605 the host LBA range to the SSD clusters and determines 610 if the host LBA range is stored, e.g., fully stored, in the flash. The FCTM layer returns 620 the response to the look up the FCI layer.

Figure 7:
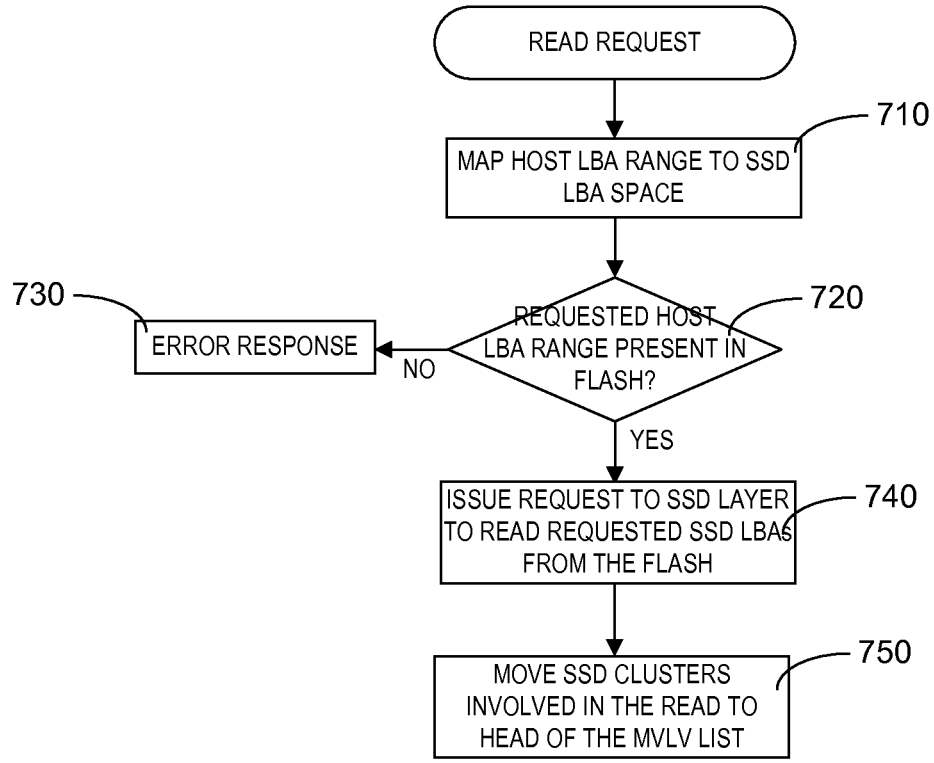
FIG. 7 is a flow diagram that conceptually illustrates implementation of a read request by the hybrid controller.

FIG. 7 is a flow diagram that conceptually illustrates a read request issued by the FCI layer to the FCTM layer. The FCI layer can request a read for any host LBA range, the requested host LBA range need not be cluster aligned. The FCTM layer maps the host LBA range of the read request to the SSD LBA space and determines 720 if the host LBA range of the read request is present in the flash. If the host LBA range is not present in the flash, an error response is generated 730 and is returned to the FCI layer. If the host LBA range of the read request is present in the flash, the FCTM creates a list of SSD LBAs involved in the read request and issues 740 requests to the SSD layer to read the requested SSD LBAs (which have been mapped from the host LBAs in the read request). The SSD LBAs read from the flash are transferred to the FCI layer. The SSD clusters involved in the read request are made most valuable and are moved 750 to the head of the MVLV list.

It is to be understood that this detailed description is illustrative only, and various additions and/or modifications may be made to these embodiments, especially in matters of structure and arrangements of parts and/or processes. Accordingly, the scope of the present disclosure should not be limited by the particular embodiments described above, but should be defined by the claims set forth below and equivalents thereof.

What is claimed is:

1. A device, comprising:
   a primary memory comprising a host memory space arranged as memory sectors corresponding to host logical block addresses (LBAs);
   a secondary memory implemented as a cache for the primary host memory; and a hybrid controller configured to:
  map clusters of host LBAs to clusters of solid state drive (SSD) LBAs, the SSD LBAs corresponding to a memory space of the cache, the mapping of the host LBA clusters to the SSD LBA clusters being fully associative wherein any host LBA cluster can be mapped to any SSD LBA cluster;
  responsive to a promotion request that specifies a cluster aligned host LBA range, use the mapping of the host LBA clusters to the SSD LBA clusters to determine if the host LBA range corresponds to one or more overlapped SSD LBA clusters present in the secondary memory;
  if the host LBA range corresponds to the one or more overlapped SSD LBA clusters, create a bitmap of the overlapped SSD LBA clusters; and
  implement a write operation to the secondary memory using the bitmap to skip writing the overlapped SSD LBA clusters to the secondary memory.

2. The device of claim 1, wherein:
the host LBA clusters comprise n contiguous host LBAs; and
the SSD LBA clusters comprise n contiguous SSD LBAs.

3. The device of claim 2, wherein n is not a power of two.

4. The device of claim 2, wherein a host LBA does not span multiple host LBA clusters.

5. The device of claim 2, wherein each host LBA is mapped to only one SSD LBA cluster at any particular time.

6. The device of claim 2, wherein a hash table maps the host LBA clusters to the SSD LBA clusters.

7. The device of claim 6, wherein each entry in the hash table points to one or more SSD LBA clusters.

8. The device of claim 7, wherein a linked list points to multiple SSD LBA clusters mapped to one entry in the hash table.

9. The device of claim 8, wherein a predetermined number of bits of a host LBA is used as index in the hash table.

10. The device of claim 5, wherein the hybrid controller is configured to implement one or more of:
  a look up request that determines whether a host LBA range is present within the secondary memory;
  a read request that reads a host LBA range from the secondary memory;
  a promote request that promotes a cluster-aligned host LBA range to the secondary memory; and
  an invalidate command that invalidates a cluster-aligned host LBA range in the secondary memory.

11. A method, comprising:
mapping clusters of host logical block addresses (LBAs) corresponding to a host LBA space to solid state drive (SSD) LBA clusters, the host LBA space corresponding to a memory space of a primary memory and the SSD LBA clusters corresponding to memory space of a secondary memory arranged to operate as a fully associative cache for the primary memory, wherein any host LBA cluster can be mapped to any SSD LBA cluster;
responsive to a promotion request that specifies a cluster aligned host LBA range, using the mapping of the host LBA clusters to the SSD LBA clusters to determine if the host LBA range corresponds to one or more overlapped SSD LBA clusters present in the secondary memory;
if the host LBA range corresponds to the one or more overlapped SSD LBA clusters, creating a bitmap of the overlapped SSD LBA clusters; and
implementing a write operation to the secondary memory using the bitmap to skip writing the overlapped SSD LBA clusters to the secondary memory.

12. The method of claim 11, wherein mapping the host LBA clusters to SSD LBA clusters comprises implementing a hash function to determine an index to a hash table, the index pointing to one or more SSD LBA clusters.

13. The method of claim 11, wherein:
clustering the host LBAs comprises clustering the host LBAs into clusters of n contiguous host LBAs; and
mapping the host LBA clusters to SSD clusters comprises mapping the host LBA clusters to SSD cluster comprising n contiguous SSD LBAs.

14. The method of claim 11, further comprising:
responsive to a read request that specifies a host LBA range, using the mapping of the host LBA clusters to the SSD LBA clusters to determine if the host LBA range corresponds to SSD LBAs present in the secondary memory; and
reading the SSD LBAs if the SSD LBAs are present in the secondary memory.

15. The method of claim 11, further comprising:
responsive to a promotion request that involves a cluster aligned host LBA range, determining if the secondary memory is saturated;
evicting a number of SSD LBA clusters if the secondary memory is saturated; and
allocating SSD LBA clusters for the promotion request; and
writing the host LBA range to the secondary memory.

16. The method of claim 11, further comprising:
responsive to a invalidate request that involves a cluster aligned host LBA range, using the mapping of the host LBA clusters to the SSD LBA clusters to invalidate SSD LBA clusters that correspond to the cluster aligned host LBA range.

17. The method of claim 11, wherein any host LBA cluster can be mapped to any SSD LBA cluster if the secondary memory is not saturated.

18. A device, comprising:
a hard magnetic disk drive (HDD) comprising a memory space arranged as memory sectors corresponding to host logical block addresses (LBAs);
flash memory implemented as a cache for the HDD; and
a hybrid controller configured to:
  map the clusters of host LBAs to clusters of solid state drive (SSD) LBAs, the SSD LBAs corresponding to a memory space of the flash memory, the mapping of the host LBA clusters to the SSD LBA clusters being fully associative wherein any host LBA cluster can be mapped to any SSD LBA cluster
  responsive to a promotion request that specifies a cluster aligned host LBA range, use the mapping of the host LBA clusters to the SSD LBA clusters to determine if the host LBA range corresponds to one or more overlapped SSD LBA clusters present in the secondary memory;
  if the host LBA range corresponds to the one or more overlapped SSD LBA clusters, create a bitmap of the overlapped SSD LBA clusters; and
  implement a write operation to the secondary memory using the bitmap to skip writing the overlapped SSD LBA clusters to the secondary memory.

19. The device of claim 18, wherein the hybrid controller is configured to implement one or more of:
  a look up request that determines whether a host LBA range is present within the flash memory;
  a read request that reads a host LBA range from the flash memory;

a promote request that promotes a cluster-aligned host LBA range to the flash memory; and an invalidate command that invalidates a cluster-aligned host LBA range in the flash memory.

\* \* \* \* \*